Nov. 29, 1955  G. Z. GREENE  2,724,968
HOUSING FOR INSTRUMENTS OR THE LIKE
Filed July 11, 1950  2 Sheets-Sheet 1
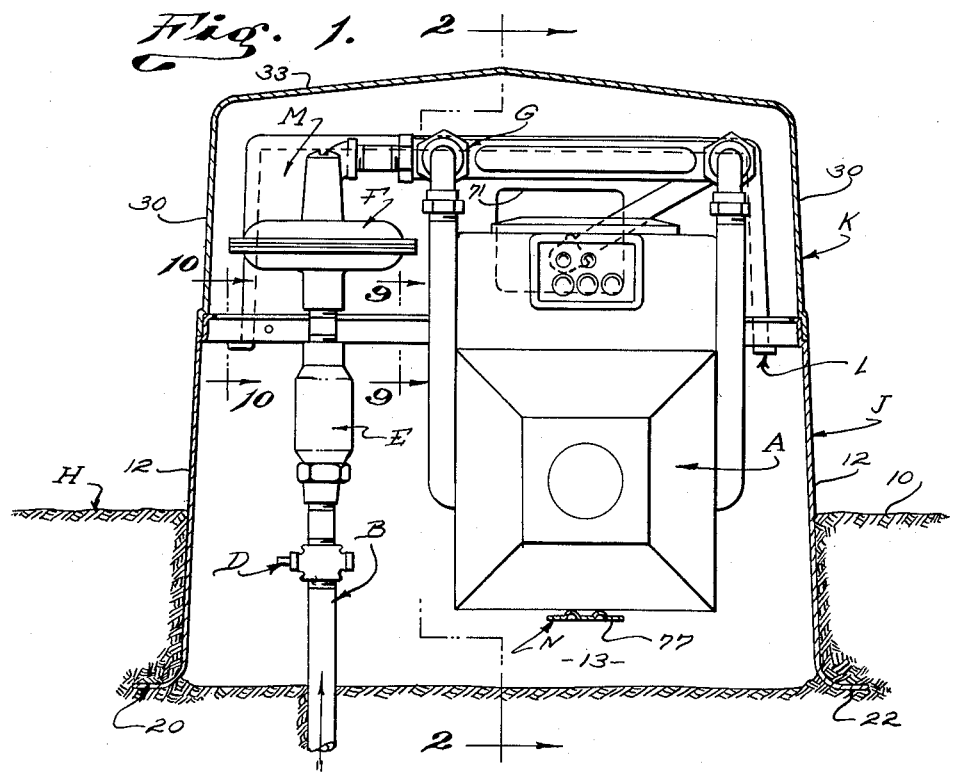
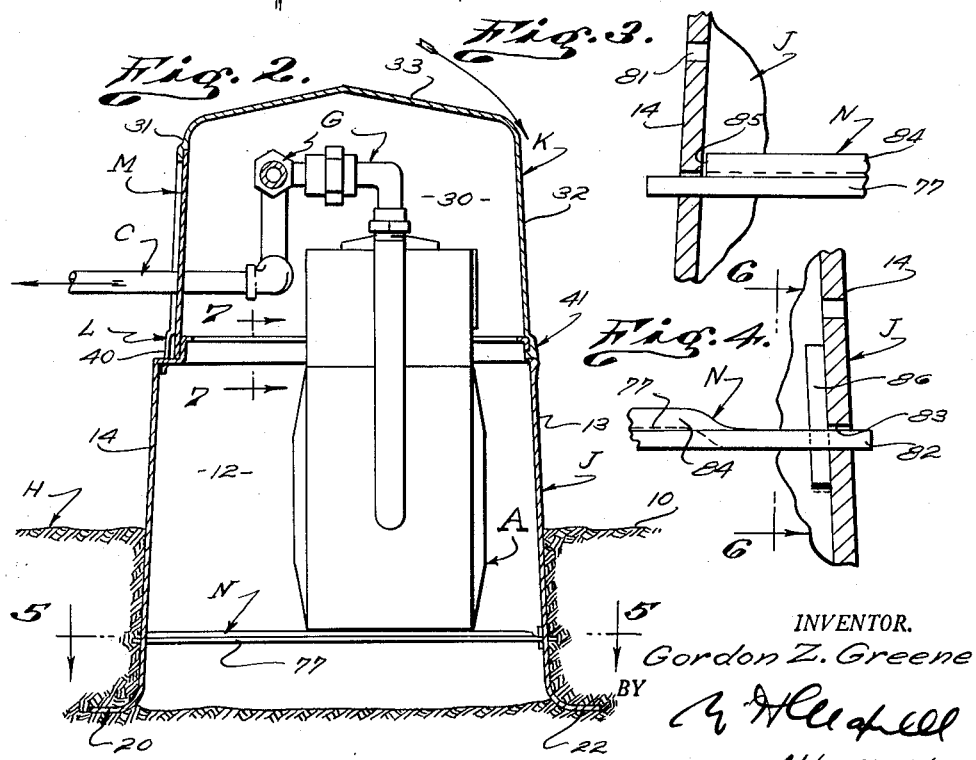
INVENTOR.
Gordon Z. Greene
BY
Attorney

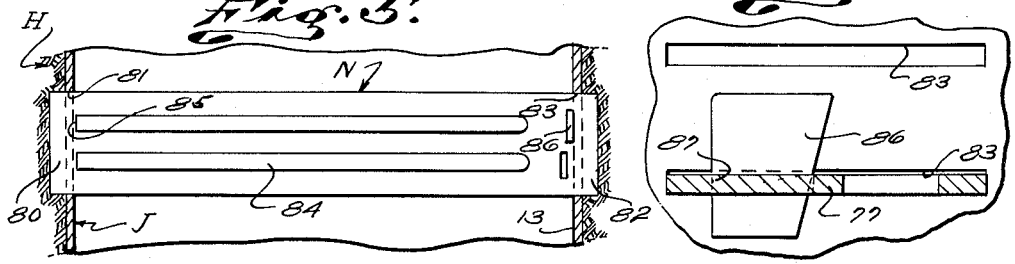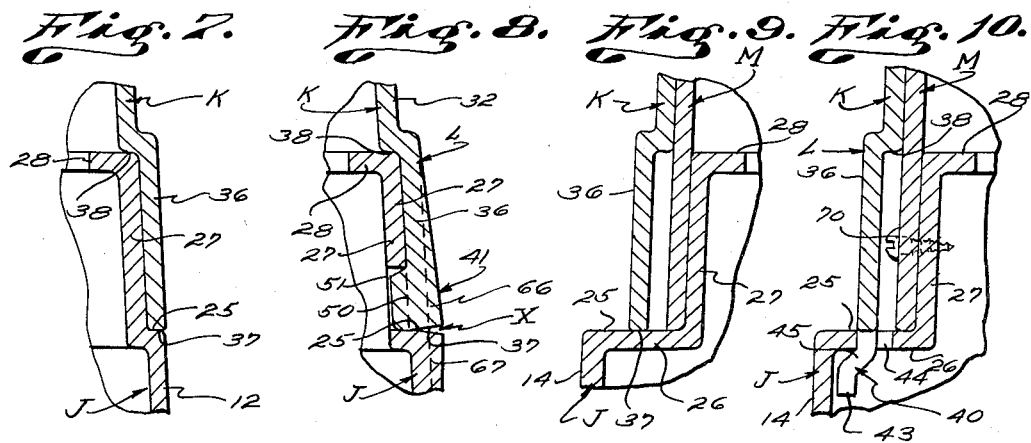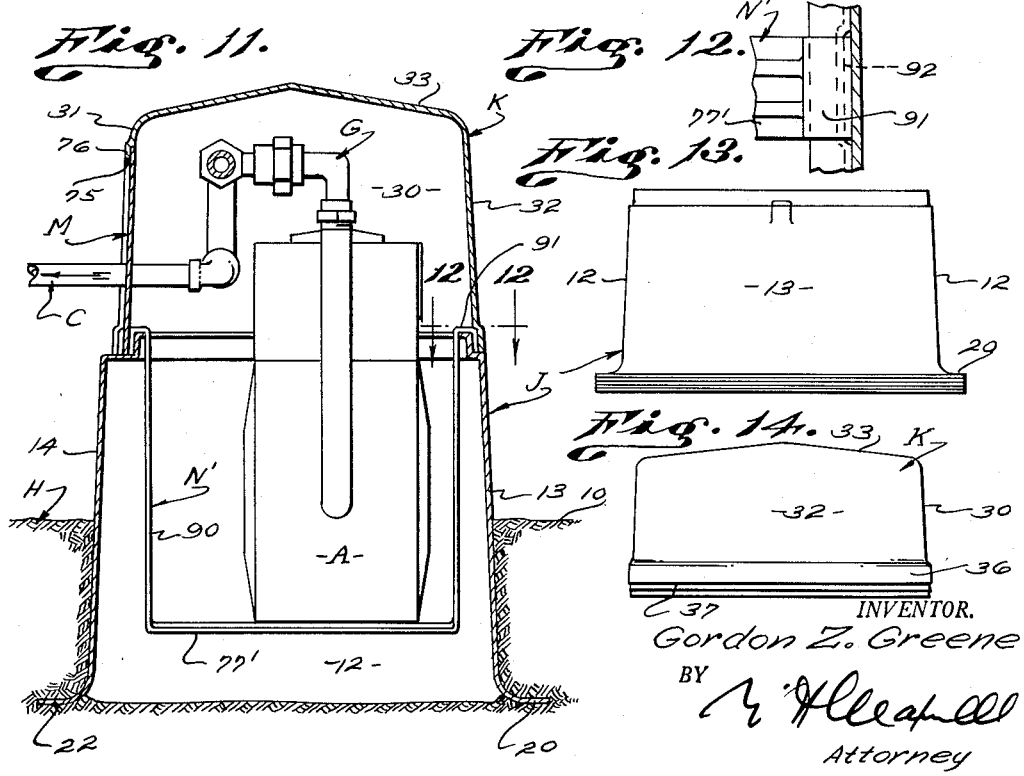

United States Patent Office 2,724,968
Patented Nov. 29, 1955

2,724,968

HOUSING FOR INSTRUMENTS OR THE LIKE

Gordon Z. Greene, Alhambra, Calif.

Application July 11, 1950, Serial No. 173,159

9 Claims. (Cl. 73—201)

This invention has to do with a housing for instruments, or the like, and it is a general object of the invention to provide a simple, practical, effective and durable construction particularly useful for the housing of meters and like instruments or accessories incidental thereto.

Meters and accessories such as filters, pressure regulators, etc., are commonly installed or used where service such as gas, light, electricity, etc. is supplied to a dwelling, building, or location, and it is common in such cases that the instruments and accessories thereto be housed or encased so that they are protected somewhat against weather and against being injured or tampered with.

In some instances meters and their accessories are located within buildings or dwellings or beneath them, or special constructions are provided for their accommodation, but the great majority of meters are usually carried in housings or cases referred to as meter boxes, and these are generally located at or on the ground adjacent the building or dwelling. Various make-shift housings are used in some cases, and it has been common, where a durable installation is desired, to employ housings molded or cast of concrete or the like. Concrete or cement meter housings are rather expensive of production, are heavy and cumbersome to handle, and are exceedingly difficult to store, in that they are bulky and must be handled with care, as otherwise they are injured.

It is a general object of this invention to provide a housing for meters or the like which is of such construction that it can be advantageously and practically constructed entirely of a composition or plastic in the nature of fiberglass, or the like. By employing a plastic material in the nature of spun or fibrous glass molded, pressed, or otherwise formed into a solid mass, a structure is formed which will not corrode, which is impervious to moisture, fumes of various kinds, and which is, in effect, indestructible.

A further object of this invention is to provide a housing of the general character referred to which is of sectional construction and is characterized by a base section which can be preliminarily or initially installed without handling of the meter, and a cap or closure section which is applied after the meter has been installed and which cooperates with the base section to effectively encase or enclose the meter.

It is a further object of this invention to provide a housing construction characterized by an extension on the base section accommodating pipes or the like that may be passed into or out of the housing and which cooperate with the top or closure section of the housing so that it can be applied or removed without disturbing the fittings or piping.

It is a further object of this invention to provide a housing of the general character referred to in which a carrier is provided in the housing to support an instrument or element such as a meter, which carrier is of simple, inexpensive construction that can be easily and quickly installed and which is highly dependable and effective in supporting a meter in an advantageous manner.

The invention provides, generally, a sectional housing characterized by a base section with upwardly convergent walls and having anchoring flanges at the lower edges of the walls. The upper edge portions of the walls are established with upwardly facing seats and have flanges that terminate, forming rests for the top section and at one wall, for instance, the rear wall, the seat is of substantial extent, in that there is a latch that projects inwardly from the upper edge of this wall. The top section is a closure for the base section and preferably has walls corresponding to those of the base section and continuing up at the same angle. The walls of the top section support a top which seals or closes the top of the structure and is preferably integral with the walls. The walls of the top section are outwardly offset at their lower edges forming shoulders that rest on the flanges of the base section, and the lowermost edges rest on the seats at the upper edges of the walls of the base section. A releasable coupling or fastening means joins the two sections and involves one or more releasable pivotal hook fasteners and one or more releasable latches. In a preferred arrangement the hook fasteners occur where the base section is provided with the ledge and the releasable latch is at the opposite side of the structure and is such that it is engaged and released by flexure of the section. A carrier is provided in the housing to support an instrument such as a meter and in one form is a beam that is simple, straight, and has its ends supported in openings in opposite walls of the base section. The beam has stiffening ribs that form stops at one end and is retained in position by a key at the other end. In another form the carrier is in the nature of a hanger with a lower or beam portion to carry a meter, or the like, and with arms that project up from the ends of the carrier and hook over the upper edge portions of the base section. Further, the construction involves an extension on the base section projecting upwardly therefrom and having an opening to accommodate or pass elements such as pipes, or the like. The extension facilitates installation of equipment in the base section with parts extending through the extension making the assembly ready for application of the cap section without disturbing any of the assembled parts. The cap section has a wall with an opening or notch that accommodates the extension of the base section.

The various objects and features of my invention will be fully understood from the following detailed description of typical forms and applications of my invention, throughout which description reference is made to the accompanying drawings, in which:

Fig. 1 is a vertical sectional view of a housing provided by the present invention illustrating a typical form of the invention being employed to house a meter and usual accessories, including a valve, filter and pressure regulator. Fig. 2 is a detailed transverse sectional view of the structure shown in Fig. 1, being a view taken as indicated by line 2—2 on Fig. 1. Fig. 3 is a detailed sectional view taken at one end of the meter carrier shown in Figs. 1 and 2, showing the manner in which it is supported by the base section of the housing. Fig. 4 is a view similar to Fig. 3, showing the other end of the carrier. Fig. 5 is a plan section of the carrier, being a view taken as indicated by line 5—5 on Fig. 2. Fig. 6 is a view taken as indicated by line 6—6 on Fig. 4. Fig. 7 is an enlarged detailed sectional view showing the joinder of the housing sections, being an enlarged view taken as indicated by line 7—7 on Fig. 2. Fig. 8 is a view similar to Fig. 7 taken at the latch provided to act between the housing sections. Fig. 9 is a view similar to Figs. 7 and 8 taken as indicated by line 9—9 on Fig. 1. Fig. 10 is a view similar to Figs. 7, 8 and 9, taken as indicated by line 10—10 on Fig. 1. Fig. 11 is a view similar to Fig. 2, showing another form of meter carrier. Fig. 12 is an enlarged plan section taken as indicated by line 12—12 on Fig. 11. Fig. 13 is a view illustrating a plurality of base sections embodying the present invention assembled or nested together for purpose of storage or transportation. Fig. 14 is a view of a plurality of top or cap sections assembled or nested together for purpose of storage or transportation.

The structure provided by the present invention is suitable, generally, for the housing of meters of various kinds and instruments or accessories incidental to meters. As an example of a typical form and application of the invention I have disclosed a housing embodying the invention, practical for receiving a typical gas meter and usual accessories, such as a control valve, a filter, a pressure regulator and manifolds or piping incidental to the meter and the accessories. In the drawings I have shown a typical gas meter A receiving flow from an inlet pipe or supply line B and passing it to an outlet or delivery pipe C. A control or stop cock D is provided in the supply line B and between the cock D and the meter A there is a filter E, a pressure regulator F and suitable manifolding G. The installation or arrangement illustrated being typical, or one which is commonly employed, the supply line or pipe B projects upwardly from the base or ground H while the delivery line C extends or issues horizontally at an elevation somewhat above the level or surface 10 of the ground.

The housing as provided by the present invention involves, generally, a lower or base section J, an upper or cap section K, fastering means L releasably joining the sections J and K together, an extension M carried by and projecting from the base section J and apertured to pass the delivery line C and cooperatively engaged by the cap section K, and an instrument carrier N located in one of the sections, preferably the base section, and serving as a support or mounting for the meter A.

The base section J of the housing is a vertically disposed tubular element, preferably rectangular in plan configuration so that it has what may be termed end walls 12, a front wall 13 and a rear wall 14. The several walls of the base section adjoin at the corners of the housing and are preferably integrally joined or connected at the corners so that they form or make up a unit or integral structure that can be advantageously molded and thus formed economically.

In accordance with the present invention the several walls of the base section J are preferably flat, of uniform thickness throughout, and are upwardly inclined or convergent so that the base section is somewhat larger in cross sectional area at its lower end than at its upper end, the taper or inclination being such as to facilitate nesting or packing of a plurality of base sections one within the other in a manner such as is illustrated in Fig. 13 of the drawings.

In accordance with the present invention a suitable anchoring means 20 is provided at the lower end of the base section and in the form of the invention illustrated the means 20 involves flange-like projections 22 extending horizontally at or from the lower ends of the walls of the base section. In the case illustrated there is an anchoring flange 22 projecting from the lower end or edge of each wall of the base section and the flanges project outwardly as clearly illustrated in Figs. 1 and 2 of the drawings. From the illustration it will be observed that the flanges are, in effect, outwardly turned extensions or continuations of the walls and are such that they do not obstruct or in any way interfere with the nesting of the base sections, as shown in Fig. 13.

The upper ends or edges of the walls of the base section terminate to form seats 25 that receive or on which the top or cap section K rests. In the preferred form of the invention the seats 25 at the upper edges of the end walls 12 and the front wall 13 are limited or confined to about the thickness of these walls, whereas at the rear wall 14 the seat is of greater extent, there being an inwardly projecting ledge 26 extending inwardly from the upper edge of the rear wall 14, as clearly illustrated in Figs. 9 and 10 of the drawings.

At the upper end of the base section I preferably provide upwardly projecting flanges 27 which project a suitable distance upward from or beyond the seats 25, the flanges being, in effect, inwardly offset upper edge portions of the walls above the seats 25, as clearly shown in Figs. 7 to 10 of the drawings. The flanges 27 may, in practice, correspond in thickness with the walls on which they are carried, and they are preferably pitched or inclined the same as the walls and are of uniform extent or height, as shown throughout the drawings. In the case illustrated stiffening ribs 28 project inwardly from the upper edges of the several flanges 27 and serve to lend substantial strength and rigidity to the upper end portion of the base section by providing the inwardly offset construction with stiffening ribs at the upper end of the base section, and by providing the anchoring flanges at the lower end of the base section this section of the housing is materially stiffened, making it possible in practice to employ thin wall sections and at the same time provide a light, inexpensive, practical and durable construction.

The cap or top section K is carried on and forms a closure for the base section J and, in practice, it may vary widely in form, size, and configuration. Where the base section is rectangular in plan configuration it is preferred that the cap section K be formed so that it presents a lower end that is rectangular in plan configuration and is such as to rest upon the lower end of the base section J. In the particular case illustrated the cap section is shown as involving end walls 30, a rear wall 31 and a front wall 32. The several walls of the cap section are preferably thin flat members, similar to the walls of the base section, and they preferably project upwardly and are inclined somewhat inwardly so that the top section is upwardly convergent and thus corresponds in general configuration with the base section. The upper end of the cap section is closed by a top 33 which is joined to and supported by the several walls of the top section, being preferably integrally joined with the said walls so that the cap section is a single, integral unit that can be advantageously formed as by molding or pressing. In the form of the invention illustrated the top 33 is somewhat crowned, or upwardly extended, as clearly illustrated in Figs. 1 and 2 of the drawings. With the construction that I have provided for the cap section K a plurality of cap sections can be assembled or nested together, as shown in Fig. 14 of the drawings.

In accordance with the present invention the lower ends or edges of the walls of the cap section rest upon or are supported by the seats 25 of the base section. In the form of the invention illustrated the lower edge portions 36 of the several walls of the top section are outwardly offset or displaced somewhat, as shown in Figs. 7 to 10 of the drawings, and present lower edges 37 that rest upon the seats 25 and establish downwardly facing shoulders 38 which rest upon the upper edges of the flanges 27. Through this construction each wall of the cap section is supported from a wall of the base section at two points, as is clearly illustrated in Figs. 7 to 10 of the drawings.

The fastening means L releasably connects or couples the two sections of the housing together and in the form illustrated it involves one or more pivotal hook connections 40 as between the rear walls 31 and 14, and one or more latch connections 41 between the front walls 32 and 13. In the particular case illustrated there are two pivotal hook connections 40 spaced a substantial distance apart and each involves a depending lug or tongue 43 projecting downwardly from the lower edge of the offset edge portion 36 of wall 31, which projection or lug is engaged in or through an aperture or opening 44 provided in the ledge 26 projecting from the upper edge of wall 14. The fit of the lug in the opening 44 is such as to allow a certain play or clearance so that the top section can be rocked or pivoted relative to the base section and the lug is bent or offset at 45 so that it hooks under the latch 26 and thus prevents lifting of the top section from the base section when the sections are fully engaged or assembled, as shown throughout the drawings. In the case illustrated there is one releasable latch 44 acting between the walls 13 and 34 and this latch involves a projection or dog 50 on the inner side of the edge portion 36 depending from the front wall 32 of the top section. The dog enters or engages in an opening or aperture 51 provided in the flange 27 projecting up from the front wall 13. The nesting or meshing parts of the sections J and K are proportioned and related so that to engage the dog in the opening 51 these parts of the housing sections must be flexed or sprung somewhat so that the dog latches into the opening 51, and likewise, to release the sections for pivotal movement or separation of the top section from the base section, it is necessary to spring or pry the structures apart, as by introducing a suitable prying tool or device between the edge portion 36 of wall 32 and the seat 25 of wall 13, as at the point X shown in Fig. 8 of the drawings. In practice I may somewhat stiffen or reinforce the parts of the sections J and K where the latch 41 occurs, as by thickening the parts at 66 and 67.

The extension M provided by the present invention is, in effect, a part or continuation of the base section J and is joined to and projects upward from the flange 27 projecting up from the ledge 26. The extension, in its preferred form, is a simple, flat plate that may be of any suitable form or configuration. In the drawings it is shown as substantially rectangular and it is joined to the base section to be rigid therewith. It is preferred that the extension be formed separately from the base section and that it be joined thereto by suitable releasable fasteners, for example, screw fasteners 70, as shown in the drawings. In accordance with the invention the extension M is provided with one or more openings 71 serving to pass elements into and out of the housing. In the case illustrated a single opening 71 is shown in the extension M and this passes the delivery pipe C. By providing the extension M an installation can be made by initially arranging the base section J in place so that it is suitably anchored or set. The parts to be carried in the housing can then be readily placed in the base section from the upper open end thereof and an element or elements such as the pipe C can be arranged through the opening 71, all without inconvenience and in a manner to expedite rapid assembly. With the parts to be housed thus assembled in or with the base section J and the extension M the top section K is arranged in place and, in accordance with the invention, the top section is provided with an opening, preferably a notch-shaped opening 75, which receives or accommodates the extension M and allows the top section to be arranged in place without interference with an element or elements such as pipe C. The notch shaped opening 75 preferably enters the rear wall 31 of the top section from the lower edge thereof and conforms in size and shape with the extension M. It is preferred, in practice, to provide an edge portion 76 on the wall 31 around the notch-like opening 75 to overlap the edge of the extension C, as shown throughout the drawings.

The carrier N employed in carrying out the present invention may vary widely in form and construction, depending upon the elements to be housed or upon required housing construction. In the form of the invention shown in Figs. 1 to 6, inclusive, the carrier involves a simple, straight, beam 77 that may be disposed horizontally in the housing to form a support or carrier for an element such as the meter A. It is preferred in practice that the beam be so arranged in the housing as to form a rest or support on which the meter can be engaged and therefore it is practical to mount the beam in the base section J of the housing. In the form of the invention under consideration the beam has an end portion 80 supported by a wall of the base section, for instance, the rear wall 14 thereof, by engaging through a slot-like opening 81 in wall 14. The other or opposite end portion 82 of the beam is supported by the front wall 13 by being engaged through an opening 83 in wall 13. In accordance with the present invention the beam, which is elongate in form and which may be formed of a single, flat plate, is provided with one or more stiffening ribs 84 and these ribs terminate at the end of the beam supported by a wall 14 so that they form stop shoulders 85 limiting the extent to which the end portion 80 can be entered in the opening 81. At the other end of the beam the ribs 84 terminate short of the supporting wall, leaving the end portion 82 clear and of such length that it can be inserted through opening 83 far enough to allow end portion 80 to be entered into opening 81 and then withdrawn, as end portion 80 enters into the opening 81.

A suitable lock is provided for maintaining the beam in position in the base section, and in the form of the invention illustrated the lock is shown as involving a key 86, preferably wedge-shaped in form and entered in an opening 87, provided in the end portion 82, so that it occurs immediately inside the wall 13, as shown throughout the drawings. In accordance with the present invention provision is made for varying or adjusting the position of the beam vertically in the base section and for this purpose the walls 13 and 14 are provided with a plurality of vertically spaced beam receiving openings, thus enabling the beam to be located in different positions as circumstances require. Since the base section is convergent it is desirable to provide the beam with a plurality of key receiving openings 87 so that the key can be placed in the beam to properly engage wall 13 regardless of the positioning of the beam in the case.

In the form of the invention illustrated in Figs. 11 and 12 of the drawings the carrier N' is in the nature of a hanger and is characterized by a beam portion 77' on which the meter may rest and arms 90 projecting upwardly from the ends of the beam and provided at their upper ends with hook portions 91 that engage over the upper edge portions of opposite walls of the section J. To facilitate or to accommodate the hook portions the upper edge portions of the base section can be recessed as at 92 so that the hooks can be engaged without interfering with proper meshing or engagement of the housing sections.

It will be apparent that by providing carriers with arms of different lengths instruments such as meters can be supported in the housing in various positions and it is to be observed that with this construction the walls of the housing are left wholly without apertures or openings which may, in some cases, be undesirable.

From the foregoing description it is to be observed that the present invention provides a housing construction which is particularly practical when formed of a composition or plastic material such as a spun or fiber-glass, pressed, worked, or otherwise established in a body or sheet form. The various elements entering into the present construction are all such that they can be readily and economically manufactured, and in practice can be made light, easy to handle, economical to store and transport, and yet provide a strong durable effective housing.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A housing of the character described including, a vertically disposed tubular base section, a cap section engageable with the upper end of the base section to close the base section, means releasably connecting the sections together, an instrument carrier supported by one of the sections to carry an instrument within the chamber defined by the sections, there being a notch-shaped opening in the cap section entering said section from its lower edge, and an extension on the base section covering the opening and having an access aperture therein.

2. A housing of the character described including, a vertically disposed tubular base section, a cap section engageable with the upper end of the base section to close the base section, means releasably connecting the sections together, a plate releasably secured to the base section to project upwardly therefrom and having an access aperture therein and an instrument carrier supported by the base section to carry an instrument within the chamber defined by the sections, there being an opening in the wall of the cap section closed by said plate when the sections are connected together.

3. A housing of the character described including, a vertically disposed tubular base section, a cap section engageable with the upper end of the base section to close the base section, means releasably connecting the sections together, an instrument carrier supported by one of the sections to carry an instrument within the chamber defined by the sections, there being a notch-shaped opening in one side of the cap section entering said section from its lower edge, an extension plate carried by and projecting up from one side of the base section to cover the notch-shaped opening in the cap section and having an access aperture therein, and releasable fastening means connecting the extension plate and base section.

4. A housing of the character described including, a vertically disposed tubular base section with substantially flat walls and substantially rectangular in plan configuration, a cap section engaged over and closing the upper end of the base section, and an instrument carrier in the base section including, a hanger having a beam portion with upwardly projecting arms at the ends of the beam and hooks on the arms engaged over the upper edges of the base section, the upper ends of the base section having recesses receiving said hooks so they occur inward and clear of the cap section.

5. A housing of the character described including, an elongate vertically disposed tubular base section having open upper and lower ends, an elongate tubular cap section having an open lower and closed upper end engageable with the upper end of the base section to close the base section, means releasably connecting the sections together against relative movement, and an instrument carrier supported by the base section to carry an instrument within the chamber defined by the sections, the carrier being a U-shaped hanger with an instrument carrying beam and arms projecting from the ends of the beam and engaged with opposite parts of the base section, the lower end of the base being engageable in the ground to close the lower end thereof.

6. A housing of the character described including, a unitary vertically disposed tubular base section open at both ends, a unitary cap section closed at the top and engageable with the upper end of the base section to close the upper end of the base section, means releasably connecting the sections rigidly together, and an instrument carrier separable from the sections and supported by one of the sections to carry an instrument within the chamber defined by the sections, one of the sections having an outwardly offset edge portion where the sections meet and the other section having an inwardly offset seat portion receiving said edge portion, the lower end of the base portion being engageable in the ground to close the lower end thereof.

7. A housing of the character described including, a unitary vertically disposed tubular base section having an open lower end engageable in the ground, a unitary cap section engageable with the upper end of the base section to close the base section, means releasably connecting the sections together against movement relative to each other, and an instrument carrier separable from the sections and supported by one of the sections to carry an instrument within the chamber defined by the sections, the base section having a seat at its upper end and a flange projecting upwardly from the inner edge of the seat and the cap section having an outwardly offset lower edge portion that engages over the flange and rests on the seat.

8. A housing of the character described adapted to receive one or more fluid conduits including, a unitary vertically disposed tubular base section having open ends, an elongate unitary cap section having a closed upper end and an open lower end and engageable with the upper end of the base section to close the upper end of the base section, and a unitary instrument carrier separable from the sections, the carrier supported by one of the sections to carry an instrument within the chamber defined by the sections for reception of a fluid conduit, both of the said sections being upwardly convergent.

9. A housing of the character described including, a unitary vertically disposed tubular base section having an open lower end engageable in the ground, an elongate unitary tubular cap section having a closed upper end and engageable with the upper end of the base section to close the upper end of the base section, means releasably connecting the sections together against movement relative to each other, and a unitary instrument carrier supported by the base section to carry an instrument within the chamber defined by the sections, each of the sections being upwardly convergent.

References Cited in the file of this patent

UNITED STATES PATENTS

| | | |
|---|---|---|
| 591,884 | Ryan | Oct. 19, 1897 |
| 670,335 | Tilden et al. | Mar. 19, 1901 |
| 721,295 | Garretson | Feb. 24, 1903 |
| 928,881 | Parsons | July 20, 1909 |
| 976,038 | Butts | Nov. 15, 1910 |
| 983,311 | McCreedy et al. | Feb. 7, 1911 |
| 1,038,146 | Jackson | Sept. 10, 1912 |
| 1,204,464 | Lofton | Nov. 14, 1916 |
| 1,265,053 | Clark | May 7, 1918 |
| 1,631,365 | Fahrenfeld | June 7, 1927 |
| 2,452,025 | Dunn | Oct. 19, 1948 |
| 2,565,782 | Rhodes | Aug. 28, 1951 |